Aug. 7, 1923.

A. STUCKI

ROLLER SIDE BEARING

Filed May 12, 1922

1,464,275

WITNESSES

INVENTOR
Arnold Stucki
By Winter & Brown
His Attys.

Patented Aug. 7, 1923.

1,464,275

UNITED STATES PATENT OFFICE.

ARNOLD STUCKI, OF PITTSBURGH, PENNSYLVANIA.

ROLLER SIDE BEARING.

Application filed May 12, 1922. Serial No. 560,336.

*To all whom it may concern:*

Be it known that I, ARNOLD STUCKI, a citizen of the United States, and a resident of Pittsburgh, in the county of Allegheny and State of Pennsylvania, have invented a new and useful Improvement in Roller Side Bearings, of which the following is a specification.

This invention relates to roller side bearings for railway cars, and particularly to a side bearing adapted to be attached to the truck or lower bolster, and cooperating with an upper bearing plate attached to the car body.

It is an object of the invention to provide a bearing of this type which is self-centering, which is simple in construction, efficient in operation, economical to manufacture, which is self-cleaning under normal operating conditions, and which is void of all special mechanism such as teeth, recesses and the like.

It has been found that in many side bearings, even of the self-centering type, that when the brakes of the train are suddenly applied the roller will no longer remain centered, but will travel towards the ends of the housing or cage under the inertia of the roller employed therein, and should the upper bearing plate attached to the car body be brought into contact with the roller while in its displaced position, the effectiveness of the bearing will be either greatly reduced or rendered ineffective.

It is a special object of the invention to provide a bearing composed of the minimum number of parts which can be easily assembled and disassembled and one in which the roller is self-centering but in which the roller will be retained in its centered position while out of contact with the car body regardless of abnormal extraneous forces set up during the breaking action above referred to without detracting from the effectiveness of the bearing whenever the car body contacts the roller.

These and other objects of the invention will more readily appear when taken in connection with the following description and the appended claims.

Figure 1:
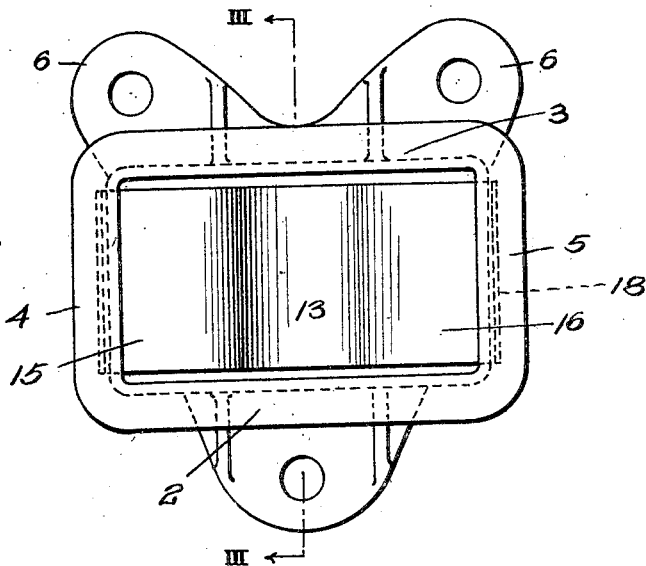
Figure 2:
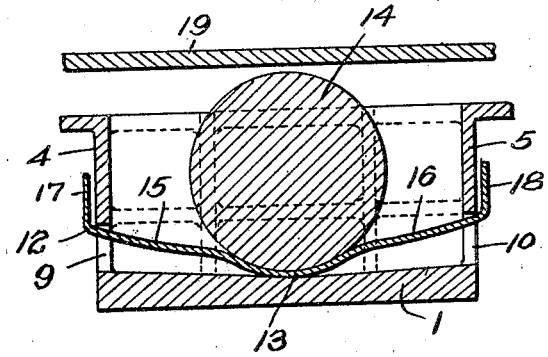
Figure 3:
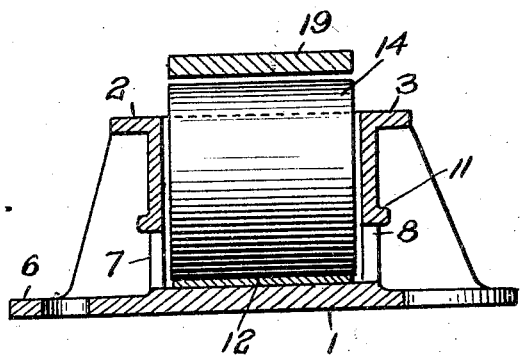

In the accompanying drawings, Fig. 1 is a plan view of the preferred construction embodying the invention; Fig. 2, a transverse sectional view of the same; and Fig. 3, a sectional view taken on line III—III of Fig. 1.

The bearing comprises a cage or housing having a bottom 1, side walls 2, 3 and end walls 4, 5, and extending from the housing are ears or lugs 6 provided with apertures for receiving bolts or rivets for connecting the bearing to the bolster of the truck. Side walls 2 and 3 are provided with the openings 7 and 8 respectively, and the end walls 4 and 5 with the respective openings 9 and 10, all of said openings being positioned near the lower portion of the housing so as to render the bearing self-cleaning. The housing is also equipped with the strengthening ribs 11.

Positioned within the housing is a spring bearing plate 12 which is peculiarly shaped for purposes to be presently described. The width of the bearing plate 12 is slightly less than the distance between the side walls 2 and 3 of the housing, and its central portion 13 is concave so as to receive and retain a cylindrical free roller 14 which is disposed within the housing and rests upon the upper surface of the bearing plate. The curvature of the concave central portion of the plate 12 corresponds substantially to that of the roller 14 for a substantial distance to either side of the point of contact between the bearing plate and the bottom of the housing, the extremities 15 and 16 of the plate extending upwardly at either side of the concave central portion, but at an inclination somewhat less than that of the central portion 13. The extremities 15 and 16 project through the end openings 9 and 10, respectively and are bent abruptly upwardly at their extreme outer ends 17 and 18, which ends lie in close proximity to the end walls 4 and 5 of the housing. The length of the bent ends 17 and 18 is slightly less than the height of the openings 9 and 10 so as to permit the plate 12 to be readily positioned by inserting the same through said openings in an obvious manner.

In assembling the parts of the bearing, one end of the spring bearing plate 12 is projected outwardly through one of the end openings 9 and 10, and the opposite end then flexed downwardly towards the bottom of the housing sufficiently to permit the upwardly bent extremity thereon to be passed through the remaining end opening by sliding the bearing plate laterally. After both of the bent ends 17 and 18 are thus positioned upon the exterior of the end walls 4 and 5, pressure upon the spring plate is released so as to permit the same to assume the form shown in Fig. 2 with the ends 17 and 18 in such position as to prevent lateral displacement of the plate. The roller 14 is merely placed within the housing so as to rest upon the bearing plate 12, and is adapted to be contacted by the bearing plate 19 attached to the car body in any well known manner.

The operation of the device is as follows:

Whenever the roller 14 is out of contact with the upper bearing plate 19, the roller normally rests upon the concave central portion 13 of the bearing plate 12, towards which the roller gravitates under its own weight. Due to the curvature of the concave portion 13 and the extent of the roller which is embraced thereby, the roller 14 will be retained in its central position under all conditions of normal operation, the parts being so proportioned that the inertia of the roller will not be sufficient to displace the same from its centered position even during the sudden application of the brakes. If the roller should tend to leave its centered position under this influence, movement thereof will result in binding the same between the spring plate and upper wear plate due to the upward inclination of the plate towards its ends, in an obvious manner. Whenever the car body sways sufficiently to bring the upper bearing plate 19 into contact with the roller, any subsequent swiveling movement of the truck will cause the roller to travel towards the end walls 4 or 5 and depress the extremities 15 or 16 of the bearing plate into contact with the bottom 1 of the housing, such extremities being free to flex under the pressure from the car body. As long as the bearing plate 19 remains in contact with the roller, the roller will maintain the bearing plate in its flexed condition, and the bearing will function in an obvious manner to permit relative movement between the truck and car body. As soon as the body lifts sufficiently to break contact between the bearing plate 19 and the roller 14, the flexed extremity 15 or 16 will move upwardly to the position shown in Fig. 2, and the roller will gravitate under its own weight along the inclined extremities back to the central concaved portion 13 in which it is retained until the contact between the car body and roller is again established and subsequent swiveling between the parts occurs.

The return of the roller occurs immediately upon the lifting of the car body and without the use of any auxiliary mechanism or parts, such as gears, levers and the like frequently employed. This quick return, due to the lack of all special lost motion devices, is found to be of great importance in practical use and with applicant's device is secured by a very simple construction. The lack of such mechanism also permits the roller to turn from time to time under impacts and shocks whereby new lines of contact between the roller and bearing plates are presented, thus prolonging the life of the bearing.

Although the length of the bent extremities 17 and 18 is slightly less than the height of the end openings 9 and 10, no difficulty in displacement of the parts during operation is experienced, due to the fact that the point of contact of the roller 14 with the spring plate 12 is always at a sufficient distance from the end walls 4 and 5 to permit the bent ends 17 and 18 to extend above the end openings.

Any dirt or foreign substances collecting within the housing or upon the bearing plate 12 during the operation of the device will find its way to the openings 7, 8, 9 and 10, which are so disposed as to permit the same to escape readily, thus rendering the bearing self-cleaning.

It is thus seen that the construction described provides a bearing which is simple, durable, inexpensive to manufacture, which is quickly responsive and self-centering, one in which the roller is maintained centered under all normal conditions of operation regardless of the sudden application of power to the brakes of the car, and in which the several parts are so related as to render the bearing self-cleaning.

I claim:

1. A side bearing for lower bolsters of railway cars comprising a housing, a spring bearing plate positioned therein, a free roller resting loosely upon the bearing plate, the intermediate portion of the spring bearing plate being concave to correspond substantially to the curvature of the periphery of the roller so as to receive the roller and retain the same in centered position when the roller is out of contact with the car body.

2. A side bearing for lower bolsters of railway cars comprising a housing, a spring bearing plate positioned therein, a free roller resting upon the bearing plate, the intermediate portion only of the spring bearing plate contacting the bottom of the housing and being curved to receive and retain the roller in centered position while out of contact with the car body, the extremities of the bearing plate being inclined to render the roller self-centering and adapted to be flexed into contact with the said bottom when the roller is moved under pressure from the car body.

3. A side bearing for lower bolsters of railway cars comprising a housing provided with a bottom and end walls, openings through the end walls adjacent the said bottom, a spring plate positioned within the housing with its central portion only in contact with the bottom and its extremities inclined upwardly from said central portion and projecting through the end openings, a free roller in the housing resting upon the spring plate, the said central portion being concave to receive and retain the roller in centered position while out of contact with the car body.

4. A side bearing for lower bolsters of railway cars comprising a housing provided with a bottom, side and end walls, openings through the end walls adjacent the said bottom, a spring bearing plate positioned within the housing with its central portion only in contact with the bottom and its extremities inclined upwardly from said central portion and projecting through the end openings, a free roller in the housing resting upon the spring plate, the said central portion being concave to receive and retain the roller in centered position while out of contact with the car body, the curvature of said concave portion corresponding substantially to that of the roller, and the ends of the spring plate being bent into proximity with the end walls of the housing to prevent displacement thereof.

5. A side bearing for lower bolsters of railway cars comprising a housing having a bottom, side and end walls, the end walls being provided with openings adjacent the said bottom, a free spring bearing plate disposed within the housing having its central portion only contacting the bottom thereof and its extremities upwardly inclined from said central portion to render the roller self-centering and projecting through the end openings, a free roller in the housing resting upon the bearing plate, the central portion of said bearing plate being concave to retain the roller in centered position while out of contact with the car body, the extreme ends of the plate being bent so as to embrace the end walls to prevent displacement thereof, the length of at least one of said bent ends being slightly less than the height of the end openings whereby to permit the spring plate to be readily inserted and removed.

In testimony whereof, I sign my name.

ARNOLD STUCKI.

Witness:
EDWIN O. JOHNS.